(12) United States Patent
James (10) Patent No.: US 7,028,818 B1
(45) Date of Patent: Apr. 18, 2006

(54) LINKAGE FOR MOTORCYCLE BRAKE

(75) Inventor: Jesse G. James, Surfside, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/730,284

(22) Filed: Dec. 9, 2003

(51) Int. Cl.
*B60T 11/00* (2006.01)

(52) U.S. Cl. .................. 188/344; 188/18 A; 74/512

(58) Field of Classification Search .............. 74/512, 74/478; 180/226, 227; 188/184, 71.6, 73.32, 188/344, 17, 18 R, 70 R, 71.5, 72.6, 73.1
See application file for complete search history.

(56) References Cited

U.S. PATENT DOCUMENTS

| 4,002,084 A | * | 1/1977 | Martins ..................... 74/512 |
| 4,667,760 A | * | 5/1987 | Takimoto ................... 180/215 |
| 4,702,340 A | * | 10/1987 | Hamilton ................... 180/224 |
| 4,719,984 A | * | 1/1988 | Watanabe ................... 180/226 |
| 4,834,221 A | * | 5/1989 | Yoshinori et al. ....... 188/188 A |
| 4,923,027 A | * | 5/1990 | Hayashi et al. ............ 180/219 |
| 5,590,998 A | * | 1/1997 | Wilcox ....................... 414/607 |
| 2003/0029656 A1 | * | 2/2003 | Matsuura et al. .......... 180/68.2 |
| 2003/0029665 A1 | * | 2/2003 | Suzuki ...................... 180/348 |

* cited by examiner

*Primary Examiner*—Robert A. Siconolfi
*Assistant Examiner*—Devon Kramer
(74) *Attorney, Agent, or Firm*—Plumsea Law Group, LLC (57) ABSTRACT

A motorcycle including a front wheel, a rear wheel, a frame, a seat and handlebars is disclosed. The motorcycle includes a linkage connecting a brake pedal with a caliper. The caliper is located within a body perimeter of the motorcycle. The caliper is adapted to engage a disk and the caliper can have a line of action. The direction of the line of action of the caliper can be different than the axis of rotation of the rear wheel. The linkage can also convert vertical motion into horizontal motion.

20 Claims, 6 Drawing Sheets

LINKAGE FOR MOTORCYCLE BRAKE

BACKGROUND OF THE INVENTION

1. Field of the Invention

The present invention is directed to motorcycles, and in particular, to a linkage for a motorcycle braking system.

2. Background of the Invention

Conventional motorcycles include front and rear brakes. Often, these brakes are in the form of disk brakes mounted to the respective front and rear axles. Specifically, rear brake assemblies generally include a rear disk mounted to a rear axle. The rear disk rotates with the rear wheel. Calipers or other devices apply a braking force to the rear disk brake, which in turn, provides a braking force to the rear wheel.

Most of the braking on a motorcycle is done by the front disk brake. It has been estimated that from 60% to 80% of the braking is done by the front wheel. Also, it is typical for the front disk brake to be applied using a hand lever disposed on a handle bar and operated by a rider's hand. In contrast, the rear disk brake is typically applied by using a brake pedal operated by one of the rider's feet.

This braking arrangement can make proper braking of the rear wheel difficult. Because the majority of the braking is done by the front wheel, very little force is required to brake the rear wheel. Because of this, the rear wheel can be locked up easily during braking. This lock up problem is compounded by the fact that the rider must brake the rear wheel with the rider's foot as opposed to the rider's hand. Riders generally find their feet less sensitive and more difficult to precisely control than their hands. A braking system that provides better brake feel and more precise control is needed.

On conventional motorcycles, rear brakes are disposed coaxially with the rear wheel. In other words, the rear brake, be it a disk or drum, shares the same axis of rotation as the rear wheel. In this conventional design, the rear brake assembly moves with the rear wheel. All of the bumps and all of the vibrations experienced by the rear wheel is also experienced by the rear brake assembly. Because of this, braking on bumpy or uneven surfaces can be difficult because the vibration of the rear brake assembly can interfere with brake feel and make it difficult to properly modulate the braking force on the rear wheel.

Also, because conventional rear brake assemblies are mounted coaxially with the rear wheel, the weight or mass of the rear brake assembly is unsprung weight. Any increase in unsprung weight is not desirable and is detrimental to a vehicle's dynamics, balance and handling characteristics.

SUMMARY

A motorcycle with a linkage is disclosed. In one aspect, the motorcycle includes a braking system comprising a brake pedal connected to a first end of brake arm, the brake arm rotating about a brake arm fulcrum in a first plane. The second end of the brake arm is connected to a rocker arm and the rocker arm rotates in a second plane, where the second plane being different than the first plane. A follower assembly is connected to the rocker arm and is adapted to move across the width of the motorcycle.

In another aspect, a downward motion of the brake pedal causes the second end of the brake arm to move upwards.

In another aspect, an upward motion of the second end of the brake arm causes the rocker arm to rotate counter-clockwise.

In another aspect, the counter-clockwise rotation of the rocker arm causes the follower assembly to move in a generally horizontal direction.

In another aspect, a distal end of the follower assembly is mechanically associated with a caliper and motion of the distal end of the follower assembly actuates the caliper and the caliper squeezes at least one brake pad against a disk.

In another aspect, the invention provides a motorcycle comprising a front wheel, a rear wheel, a frame, a seat and handlebars. The motorcycle also has a body perimeter and a mechanical linkage connecting a brake pedal with a caliper. The caliper is located within the body perimeter of the motorcycle.

In another aspect, the brake pedal is on one side of the motorcycle and the caliper is on the other side of the motorcycle.

In another aspect, the mechanical linkage includes a follower assembly that extends from one side of the motorcycle to the other side of the motorcycle.

In another aspect, the mechanical linkage converts vertical motion into horizontal motion.

In another aspect, the brake pedal pivots about a brake arm fulcrum and includes a forward brake arm and a rear brake arm, and wherein the forward brake arm is adapted to receive a rider's foot, and wherein the rear brake arm is connected to an actuator that can be driven upwards.

In another aspect, the actuator is connected to a first end of a rocker arm and upwards motion of the actuator rotates the rocker arm, and wherein a follower assembly is connected to a second end of the rocker arm, whereby rotation of the rocker arm moves the follower assembly in a generally horizontal direction.

In another aspect, the mechanical linkage includes a rocker arm that converts generally vertical motion into generally horizontal motion.

In another aspect, the invention provides a motorcycle comprising a front wheel, a rear wheel having an axis of rotation, a frame, a seat and handlebars. The motorcycle also includes a braking system including a linkage that associates a brake pedal with a caliper. The caliper has a line of action and is adapted to engage a disk. The line of action of the caliper has a direction that is different than the axis of rotation of the rear wheel.

In another aspect, the caliper includes a first disk pad and a second disk pad, and the second disk pad is disposed forward of the first disk pad.

In another aspect, the first and second disk pads are disposed laterally with respect to the motorcycle.

In another aspect, the linkage includes a rocker arm that converts generally vertical motion into generally horizontal motion.

In another aspect, the linkage includes a follower assembly that extends from one side of the motorcycle to the other side.

In another aspect, the follower assembly moves in a generally horizontal direction and wherein the horizontal motion of the follower assembly actuates the caliper.

In another aspect, the line of action of the caliper is in a direction substantially similar to a longitudinal axis of the motorcycle.

In another aspect, the caliper engages a disk adapted to brake a rear wheel and having an axis of rotation different than the axis of rotation of a rear wheel.

Other configurations, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views. In the drawings.

DETAILED DESCRIPTION

Figure 1:
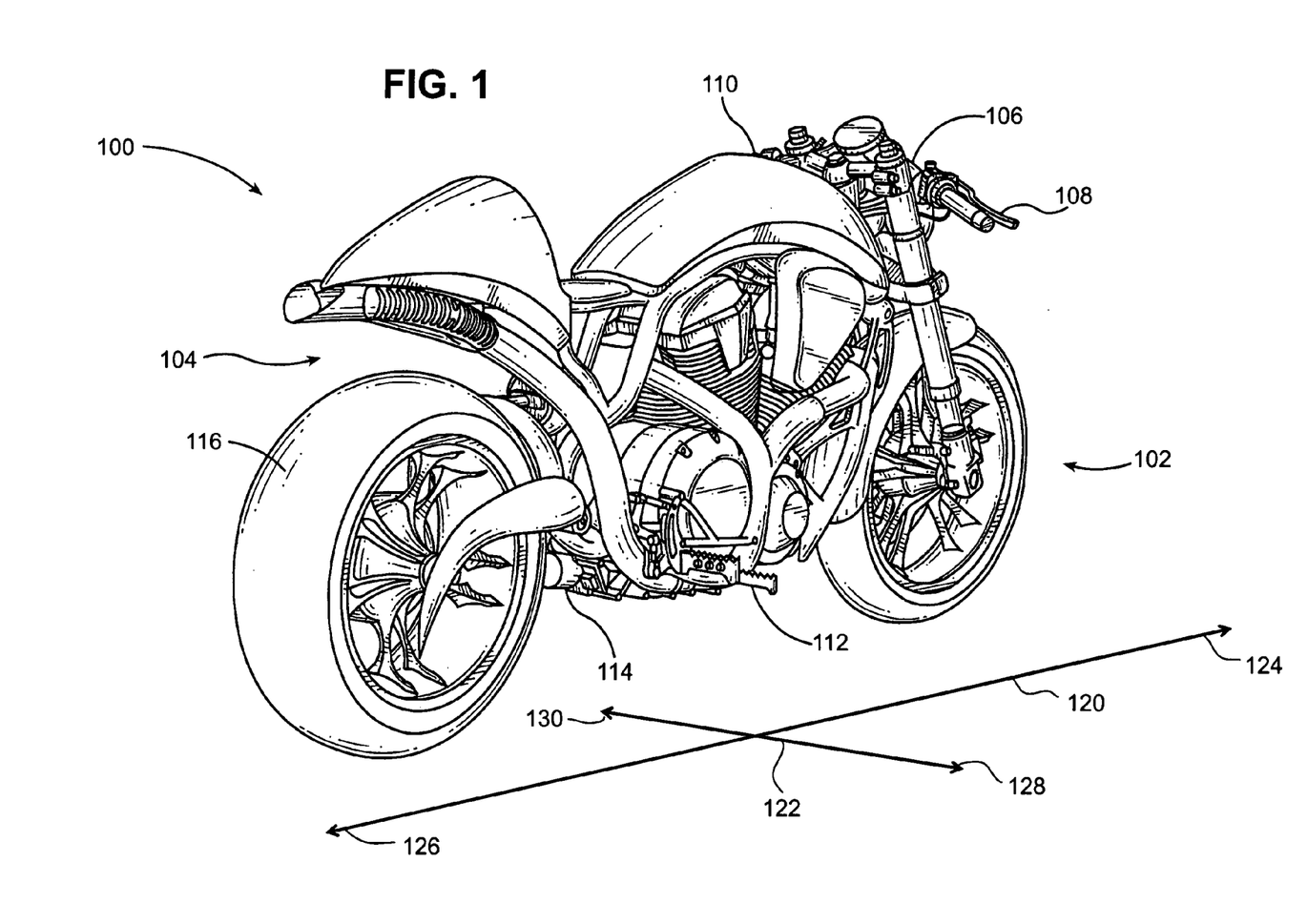
FIG. 1 is a perspective view of a preferred embodiment of a motorcycle in accordance with the present invention.

FIG. 1 is a perspective view of a preferred embodiment of a motorcycle 100 in accordance with the present invention. Motorcycle 100 includes a first side 102 and a second side 104. In the embodiment shown in FIG. 1, first side 102 is the right side, from the perspective of the rider, and second side 104 is the left side from the perspective of the rider.

Motorcycle 100 also includes a longitudinal axis 120 and a lateral axis 122. Longitudinal axis 120 extends along the length of motorcycle 100. One direction of longitudinal axis 120 is a forward direction 124 and another direction of longitudinal axis 120 is a rearward direction 126. Lateral axis 122 extends generally from one side to the other. In the embodiment shown in FIG. 1, lateral axis 122 extends in a left direction 130 and a right direction 128. Lateral axis 122 generally extends in a direction different than longitudinal axis 120. In some embodiments, lateral axis 122 is generally perpendicular to longitudinal axis 120.

Motorcycle 100 includes a handlebar 106, which is designed to be grasped by a rider and used by the rider to control motorcycle 100. Handlebar 106 includes a right portion and a left portion. Right portion of handlebar 106 includes a lever 108 that controls front brake 140 (see FIG. 2) and the left portion of handlebar 106 includes a clutch lever 110 that controls the clutch, as conventionally known.

Motorcycle 100 also includes additional controls in the form of pedals designed to be operated by the feet of the rider. Left pedal 114 (see FIGS. 2 and 5) includes a shifter and right pedal 112 is used to brake rear wheel 116. Right pedal 112 can also be referred to as a brake pedal.

Figure 2:
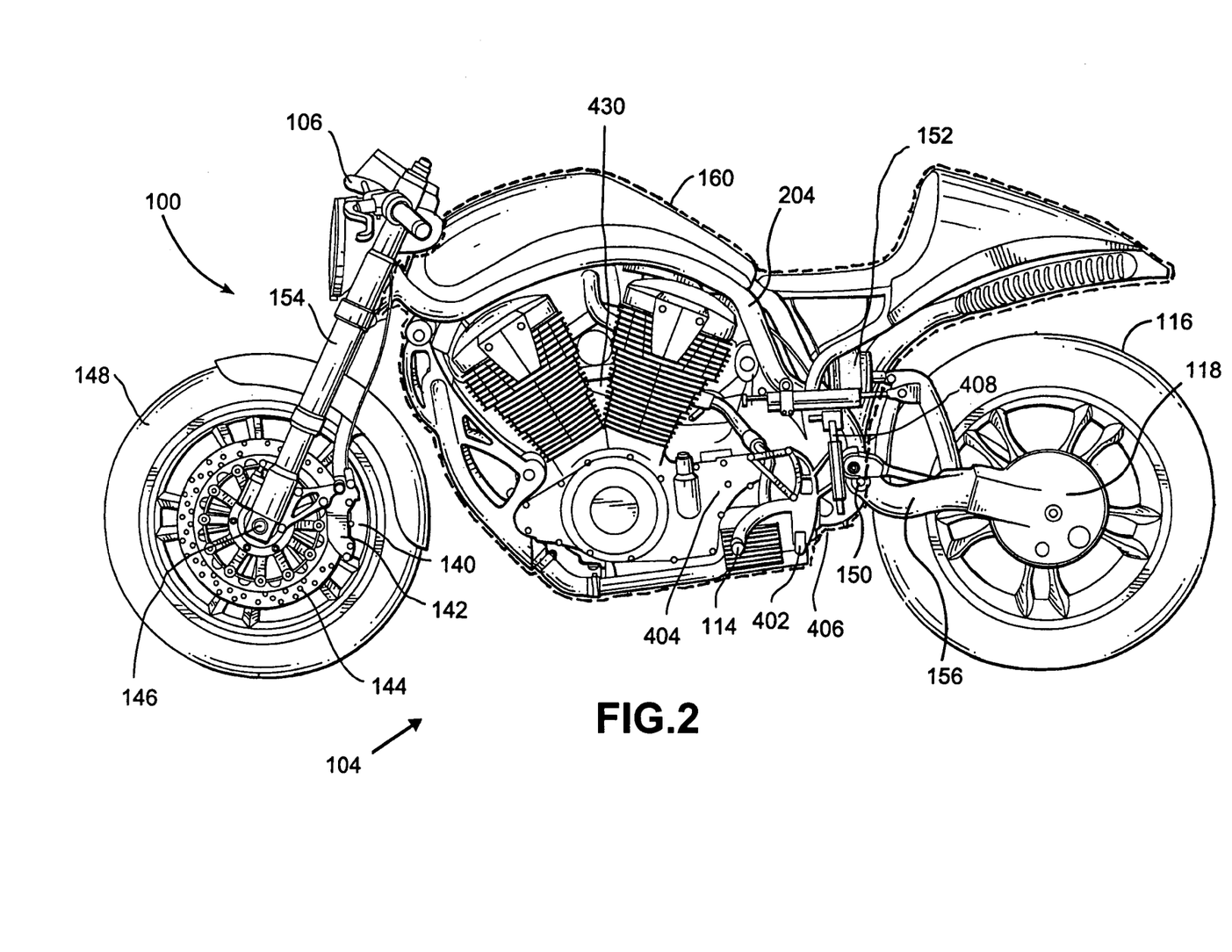
FIG. 2 is an elevation view of the motorcycle shown in FIG. 1.

FIG. 2 is an elevational view of motorcycle 100. FIG. 2 shows the left side 104 of motorcycle 100. The front portion of motorcycle 100 includes front brake 140, which comprises front caliper 142 and front disk 144. Front disk 144 rotates about front axle 146. Front wheel 148 also rotates about front axle 146. Front wheel 148 and front disk 144 are rigidly related, so that a braking force imposed on front disk 144 is transferred to front wheel 148. Front axle 146 is associated with front fork 154. Preferably, front fork 154 includes one or more shock absorbers that provide a front suspension system to motorcycle 100.

Preferably, motorcycle 100 includes a rear suspension. In some embodiments, motorcycle 100 includes a rear suspension that includes a swing arm assembly 156. Swing arm assembly 156 is attached to frame 204 by a rear pivot 150. The rear suspension can also include a shock absorber 152. The preferred embodiment of shock absorber 152 is disclosed in U.S. patent application Ser. No. 10/730,282 filed on Dec. 9, 2003, which is assigned to the same assignee as the present application, the entirety of which is incorporated by reference herein.

Motorcycle 100 also includes a body perimeter 160. Body perimeter 160 is defined as an imaginary boundary around frame 204 and all of the components connected to it except for those items that are designed to move freely relative to frame 204. In the embodiment shown in FIG. 2, handlebar 106 and swing arm assembly 156 would be excluded from body perimeter 160 because those items are designed to move freely with respect to frame 204.

As known in the vehicle arts, the "sprung weight" of a vehicle refers to the weight of all the components that are supported by the suspension system. In contrast, "unsprung weight" refers to all of the components that are not supported by the suspension system. Unsprung weight includes those components that are mounted outboard of the suspension systems and typically include items such as wheels and tires, brake assemblies, and front and rear axles. Regarding suspension components such as swing arms, forks and shock absorbers it is common practice to divide the mass or weight of these components between sprung weight and unsprung weight. So, for example, front fork might be assigned a sprung weight percentage of N % and an unsprung weight percentage of (100-N)%. Sprung weight is also sometimes referred to as "sprung mass."

Figure 3:
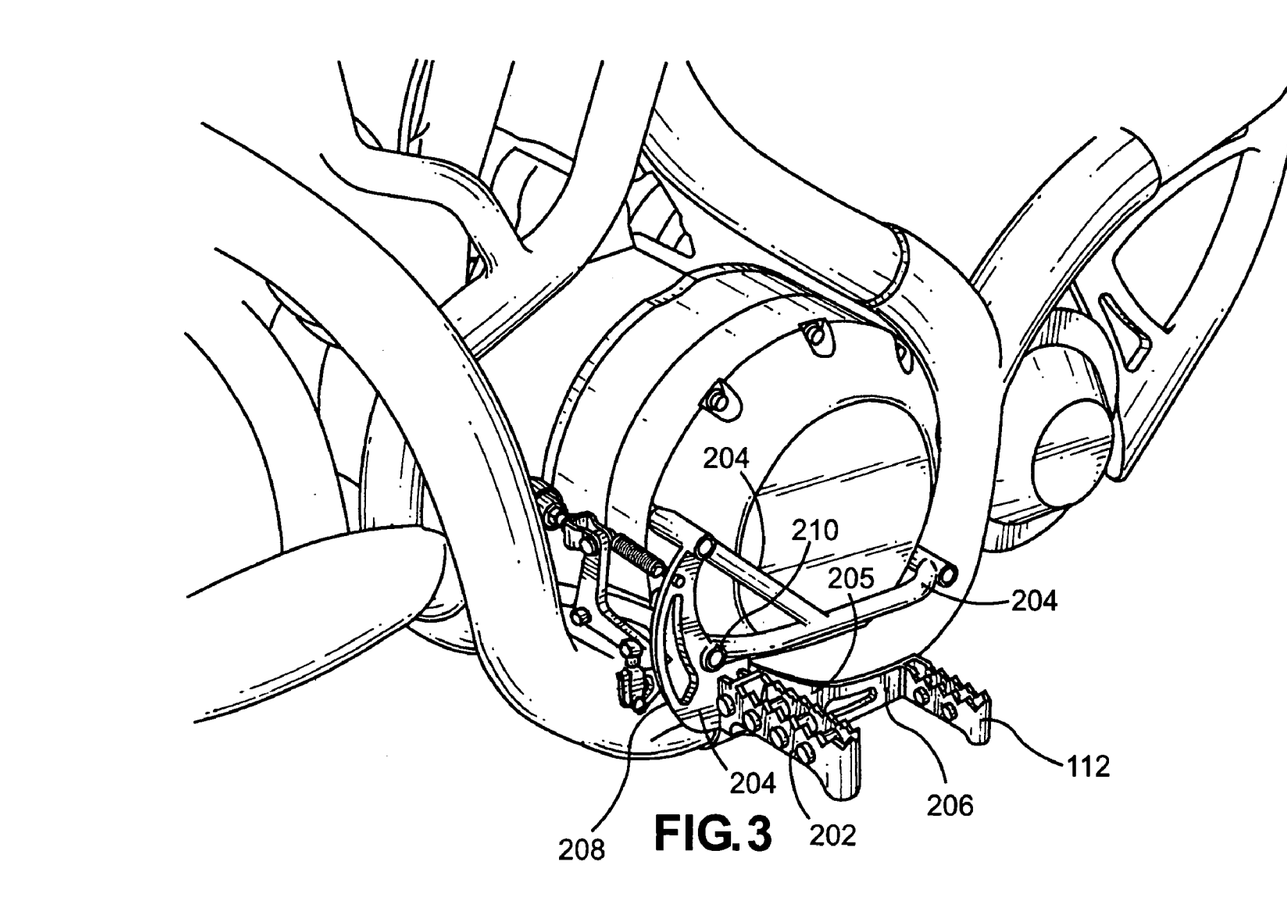
FIG. 3 is an enlarged perspective view of the right side of motorcycle shown in FIG. 1.

FIG. 3 is an enlarged view of the right side 102 of motorcycle 100. Referring to FIG. 3, peg 202 is mounted to frame 204. Preferably, peg 202 can be pivoted or folded to a non-use position if desired. Brake pedal 112 is mounted to brake arm 205 that includes a forward brake arm portion 206 and a rear brake arm portion 208. Disposed between forward brake arm 206 and rear brake arm 208 is brake arm fulcrum 210. Preferably, brake arm 205 rotates about brake arm fulcrum 210, which is rotationally associated with frame 204. In other words, brake arm 205 is attached to frame 204 at brake arm fulcrum 210 in a manner that permits brake arm 205 to rotate relative to frame 204. The rotation of brake arm 205 occurs in a first plane. In the embodiment shown in the Figures, this first plane extends in a generally longitudinal direction.

Figure 4:
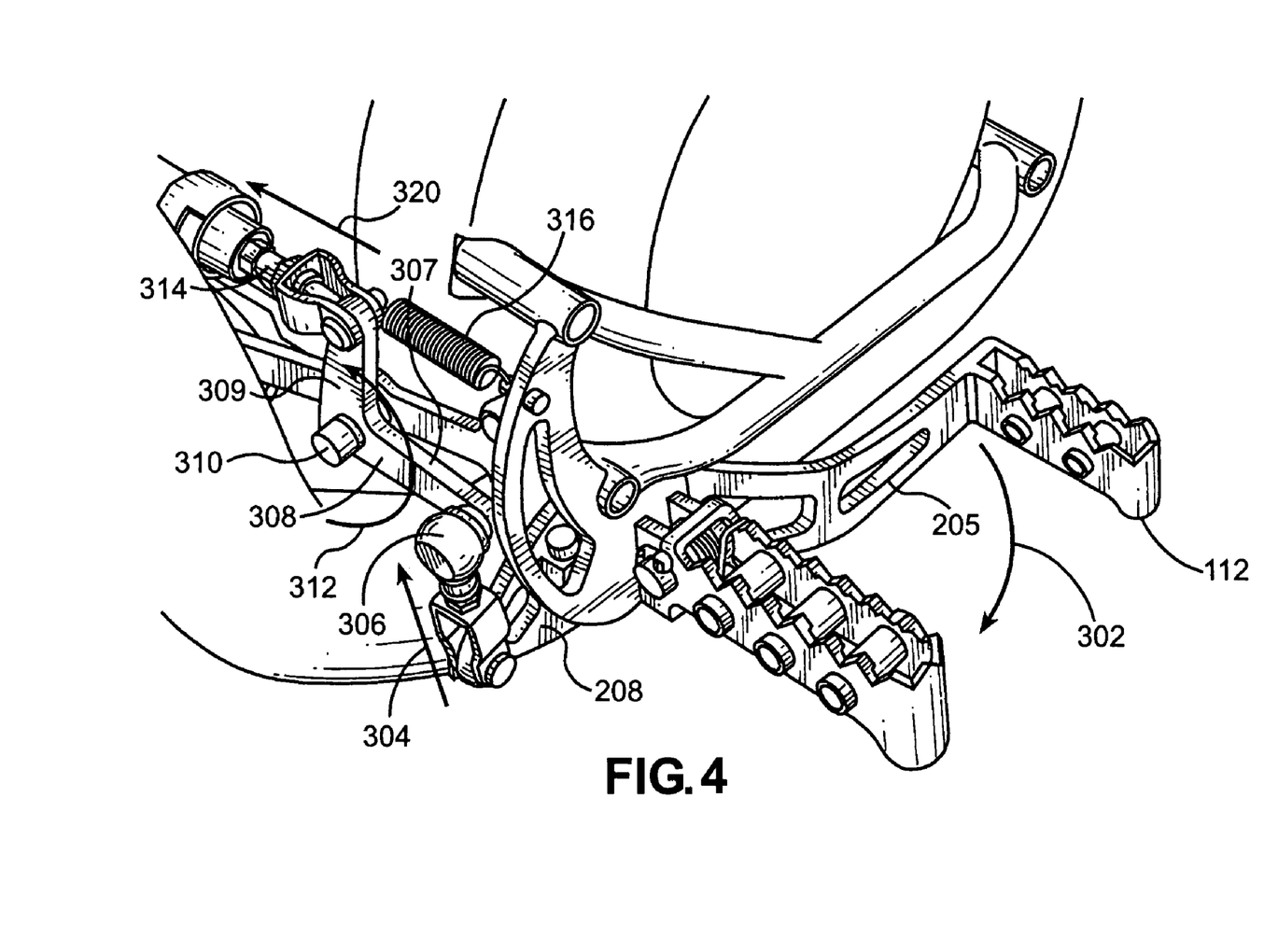
FIG. 4 is an enlarged view of a preferred embodiment of a brake pedal and associated components in accordance with the present invention.

Referring to FIG. 4, which is an enlarged view of brake pedal 112 and other associated components, the operation of brake pedal 112 and its associated linkage can be observed. As brake pedal 112 is pressed downwards 302, brake arm 205 rotates clockwise about brake arm fulcrum 210. This clockwise motion 302 tends to move rear brake arm 208 upwards 304. Rear brake arm 208 is connected to an actuator 306, which is also driven upwards 304 by the motion of rear brake arm 208.

Actuator 306 is connected to a first arm 307 of rocker arm 308. This in turn, induces rocker arm 308 to rotate 312 about rocker arm fulcrum 310 in a counter clockwise direction 312. The rotation 312 of rocker arm 308 occurs in a second plane. This second plane is different than the first plane, in which brake arm 205 rotates. In the embodiment shown in the Figures, this second plane extends in a generally lateral direction. Rocker arm 308 includes a second arm 309. Second arm 309 is connected to follower assembly 314 and spring 316. Rocker arm 308 pivots or rotates about rocker arm fulcrum 310 against the bias of spring 316, which is designed to bias rocker arm 308 in a clockwise direction. This bias also helps to raise brake pedal 112 to a rest position, as shown in FIG. 4.

The counter clockwise motion 312 of rocker arm 308 causes follower assembly 314 to move in an inward direction, towards the inner portion of motorcycle 100 (see FIG. 1) and towards the other side of the motorcycle. In some cases, follower assembly 314 can move in a generally horizontal direction.

Figure 5:
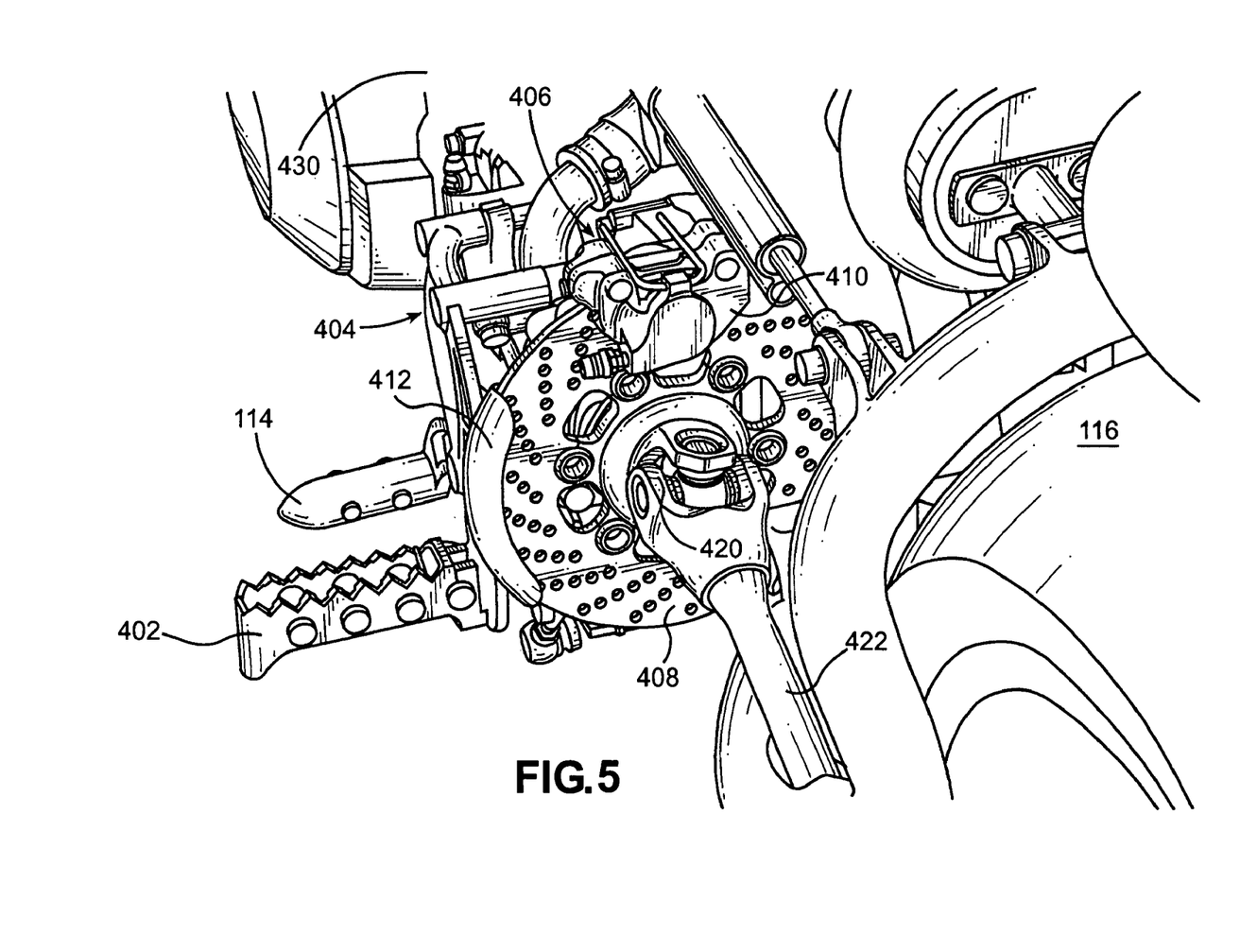
FIG. 5 is a perspective view of the left side of the motorcycle shown in FIG. 1.
Figure 6:
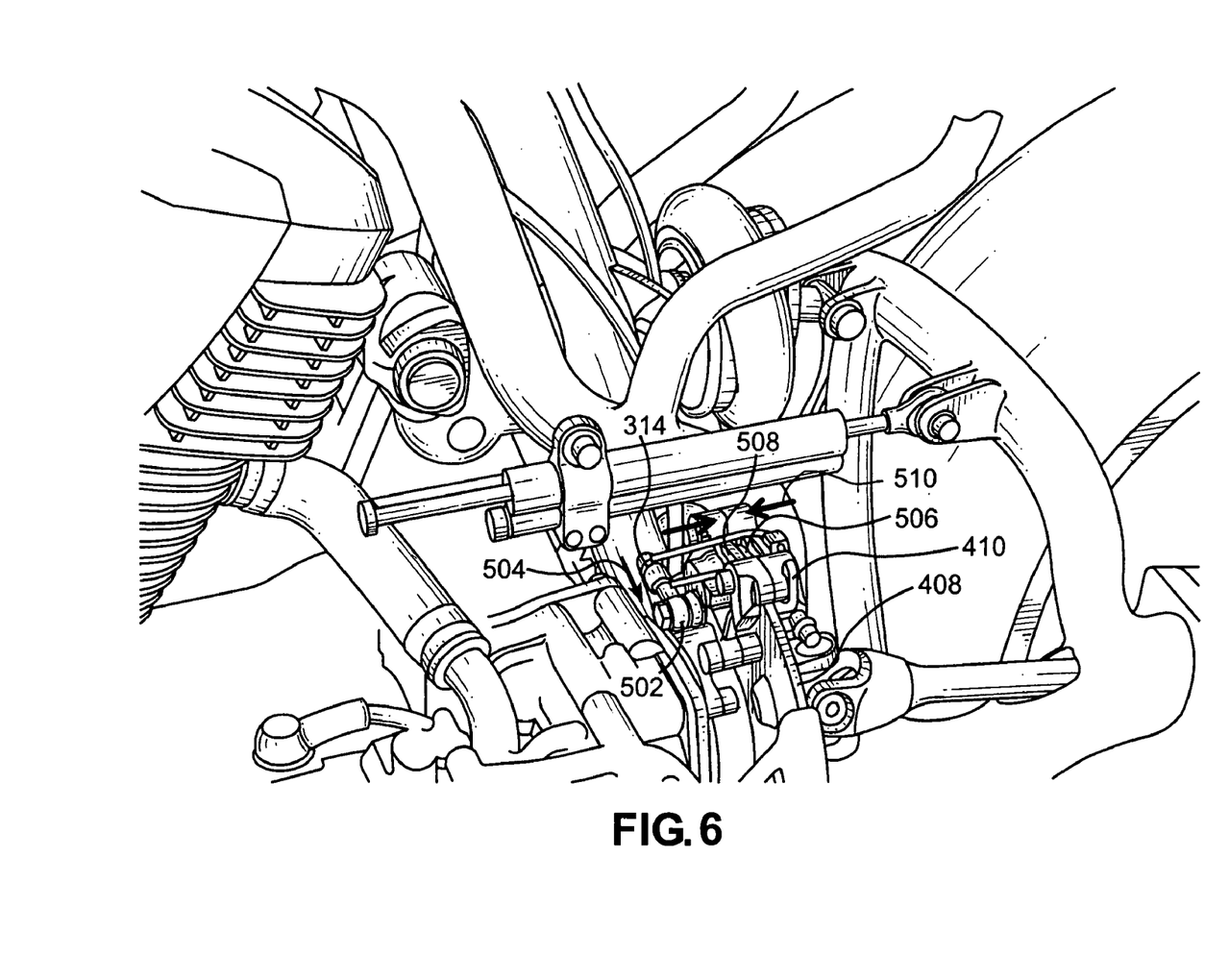
FIG. 6 is an enlarged perspective view of a preferred embodiment of a caliper in accordance with the present invention.

The motion of follower assembly 314 on the left side 104 of motorcycle 100, as well as components on the left side 104 of motorcycle 100, can be observed with reference to FIGS. 2, 5 and 6.

FIG. 5 shows a perspective view, looking forward, of the left side 104 of motorcycle 100. Referring to FIGS. 2 and 5, motorcycle 100 includes a left peg 402 and a shifter 114. Shifter 114 is mechanically linked to gearbox 404 and gearbox 404 is mechanically coupled to engine 430, as is conventionally known.

The output shaft of gearbox 404 is attached to rear disk brake assembly 406. Rear disk brake assembly 406 includes disk 408, caliper 410 and fender 412. Fender 412 is designed to keep the rider, passenger or articles of clothing from being caught in disk 408. In the embodiment shown in the Figures, the output shaft is connected to first side 440 (see FIG. 6) of disk 408. A universal joint 420 is attached to the rear, or second side 442 of disk 408 and a drive shaft 422 is attached to universal joint 420. Disk 408 includes an axis of rotation centrally located on disk 408. Disk 408 rotates about this axis of rotation. Axis of rotation of disk 408 can be similar to the axis of rotation of the output shaft of gearbox 404. The axis of rotation of disk 408 can also be similar to the axis of rotation of the portion of universal joint 420 attached to disk 408. In some embodiments, universal joint 420 is replaced by a constant velocity (CV) joint. CV joints can be used when a more consistent angular velocity output is desired. Drive shaft 422 drives rear wheel 116 through a typical shaft drive arrangement.

Preferably, as shown in FIG. 2, disk 408 is disposed within body perimeter 160 of motorcycle 100. As noted above, body perimeter 160 of motorcycle 100 is an imaginary boundary that encompasses those components that are attached to frame 204. So this imaginary boundary extends to the periphery of all of the components attached to frame 204. As shown in FIG. 2, disk 408 is mounted within body perimeter 160. In some embodiments, rear disk brake assembly 406, in addition to disk 408, is located within body perimeter 160.

Preferably, rear brake assembly 406 is also located on motorcycle 100 as sprung weight. Recall that sprung weight or sprung mass means that a component is supported by the vehicle's suspension system. Thus, it is preferred that rear brake assembly 406 be supported by the suspension of motorcycle 100.

In the embodiment shown in the Figures, sprung weight would include all of the components mounted inboard or inward of front fork 154—in those embodiments where front fork 154 includes front suspension components and provides the front suspension for motorcycle 100—and forward, or inward of rear suspension 152. In contrast to sprung weight, in the embodiment shown in the Figures, unsprung weight would include those components mounted outboard, or beyond front fork 154, such as front wheel 148, front axle 146 and front brake assembly 140. Unsprung weight would also include those components mounted outboard, or beyond rear suspension 152. In the embodiment shown in the Figures, that would include rear wheel 116 and rear drive assembly 118.

Applying these definitions to the embodiment shown in the Figures, disk 408 clearly qualifies as sprung weight as opposed to unsprung weight. As shown in the Figures, disk 408 is mounted so that its weight is supported by the front suspension and the rear suspension. Front fork 154 provides the front suspension and rear suspension 152 is shown in FIG. 2. In the embodiment shown in the Figures, disk 408 qualifies as sprung weight because its weight is supported by front fork 154 and rear suspension 152.

It can also be observed that disk 408 is spaced from rear wheel 116 and disposed inboard of rear wheel 116. In this arrangement, braking force is applied to disk 408, which is attached to drive shaft 422, as opposed to braking force being directly applied to rear wheel 116. Because disk 408 is rotationally mounted to the output shaft of gearbox 404 as opposed to a moving wheel, this inboard arrangement provides better brake feel and modulation, especially on bumpy surfaces. Also, because disk 408, caliper 410, fender 412 and other components that comprise disk brake assembly 406 are mounted in a manner that qualifies brake assembly 406 as sprung weight, this arrangement reduces overall unsprung weight of motorcycle 100. This enhances the ability of the rear suspension to control rear wheel motion. This also improves the dynamics and balance of motorcycle 100 and also improves handling. This arrangement also makes braking easier and requires less foot pressure from the rider than a typical braking system.

As shown in FIGS. 2, 4 and 6, disk 408 of rear brake assembly 406 is disposed proximate gearbox 404 and receives the output shaft of gearbox 404. Preferably, the output shaft of gearbox 404 is coupled directly to disk 408 so that disk 408 shares a similar axis of rotation as the output shaft. In some embodiments, disk 408 and the output shaft share the same axis of rotation. Because of this arrangement, the axis of rotation of disk 408 is more closely aligned with the longitudinal axis 120 (see FIG. 1) of motorcycle 100 than the lateral axis 122 (see FIG. 1) of motorcycle 100. In some embodiments, the axis of rotation of disk 408 is nearly parallel to longitudinal axis 120.

It can also be observed that the axis of rotation of disk 408 has a different direction than lateral axis 122 and also extends in a direction different the axis of rotation of rear wheel 116. It can also be observed that the axis of rotation of disk 408 is spaced from the axis of rotation of rear wheel 116.

Returning to the motion of follower assembly 314, FIG. 6 is an enlarged perspective view of caliper 410. Follower assembly 314 is attached to a bottom portion of caliper 410. Recall from above that follower assembly 314 is being pushed from the right side 102 of motorcycle 100 to the left side 104 of the motorcycle 100. As shown in FIG. 6, distal end 502 of follower assembly 314 tends to move away from motorcycle 100 in direction 504. This motion squeezes caliper 410 so that first brake pad 506 and second brake pad 508 engage disk 408.

First brake pad 506 is disposed rearward of second brake pad 508. These disk pads move towards each other when caliper 410 is activated. The disk pads 506 and 508 have a line of action 510 that is in a direction generally different than lateral axis 122 (see FIG. 1). In the embodiment shown in the figures, rear wheel has an axis of rotation that is generally similar to lateral axis 122. It can be observed that the line of action of disk pads 506 and 508 is generally different than the axis of rotation of rear wheel 116. In some embodiments, line of action 510 is in a direction that is similar to longitudinal axis 120 (see FIG. 1).

While various embodiments of the invention have been described, it will be apparent to those of ordinary skill in the art that may more embodiments and implementations are possible that are within the scope of the invention.

What is claimed is:

1. A motorcycle with a braking system including a linkage comprising:
    a brake pedal connected to a first end of brake arm, the brake arm rotating about a brake arm fulcrum in a first plane;
    a second end of the brake arm being mechanically connected to a rocker arm;
    the rocker arm rotating in a second plane, the second plane being angled from the first plane; and
    a follower assembly connected to the rocker arm and adapted to move across the width of the motorcycle.

2. The motorcycle according to claim 1, wherein a downward motion of the brake pedal causes the second end of the brake arm to move upwards.

3. The motorcycle according claim 2, wherein the upward motion of the second end of the brake arm causes the rocker arm to rotate counter-clockwise.

4. The motorcycle according to claim 3, wherein the counter-clockwise rotation of the rocker arm causes the follower assembly to move in a generally horizontal direction.

5. The motorcycle according to claim 1, wherein a distal end of the follower assembly is mechanically associated with a caliper and motion of the distal end of the follower assembly actuates the caliper and the caliper squeezes at least one brake pad against a disk.

6. A motorcycle comprising:
    a front wheel, a rear wheel, a frame, a seat and handlebars; the motorcycle also having a body perimeter; and
    a mechanical linkage comprising a plurality of generally rigid links connecting a brake pedal with a caliper, wherein the caliper and an associated brake disk are located within the body perimeter;
    and wherein the brake pedal is on one side lateral of the motorcycle and wherein the caliper is on the other lateral side of the motorcycle.

7. The motorcycle according to claim 6, wherein the brake pedal is on a right side one side of the motorcycle and wherein the caliper is on a left side of the motorcycle.

8. The motorcycle according to claim 6, wherein the mechanical linkage includes a follower assembly that extends from one side of the motorcycle to the other side of the motorcycle.

9. The motorcycle according to claim 6, wherein the mechanical linkage converts vertical motion into horizontal motion.

10. The motorcycle according to claim 6, wherein the brake pedal pivots about a brake arm fulcrum and includes a forward brake arm and a rear brake arm, and wherein the forward brake arm is adapted to receive a rider's foot, and wherein the rear brake arm is connected to an actuator that can be driven upwards.

11. The motorcycle according to claim 10, wherein the actuator is connected to a first end of a rocker arm and upwards motion of the actuator rotates the rocker arm, and wherein a follower assembly is connected to a second end of the rocker arm, whereby rotation of the rocker arm moves the follower assembly in a generally horizontal direction.

12. The motorcycle according to claim 6, wherein the mechanical linkage includes a rocker arm that converts generally vertical motion into generally horizontal motion.

13. A motorcycle comprising:
    a front wheel, a rear wheel having an axis of rotation, a frame, a seat and handlebars;
    a braking system including a linkage associating a brake pedal with a caliper having a line of action, the caliper adapted to engage a disk;
    wherein the line of action of the caliper has a direction that is different than the axis of rotation of the rear wheel; and wherein
    a seat of the motorcycle is longitudinally aligned with the rear wheel.

14. The motorcycle according to claim 13, wherein the caliper includes a first disk pad and a second disk pad, and wherein the second disk pad is disposed forward of the first disk pad.

15. The motorcycle according to claim 13, wherein the caliper includes a first disk pad and a second disk pad, and wherein the first and second disk pads are disposed laterally with respect to the motorcycle.

16. The motorcycle according to claim 13, wherein the linkage includes a rocker arm that converts generally vertical motion into generally horizontal motion.

17. The motorcycle according to claim 13, wherein the linkage includes a follower assembly that extends from one side of the motorcycle to the other side.

18. The motorcycle according to claim 17, wherein the follower assembly moves in a generally horizontal direction and wherein the horizontal motion of the follower assembly actuates the caliper.

19. The motorcycle according to claim 13, wherein the line of action of the caliper is in a direction substantially similar to a longitudinal axis of the motorcycle.

20. The motorcycle according to claim 13, wherein the caliper engages the disk adapted to brake a rear wheel and having an axis of rotation different than the axis of rotation of a rear wheel.

* * * * *